US011192257B2

(12) United States Patent
Hayashi

(10) Patent No.: US 11,192,257 B2
(45) Date of Patent: Dec. 7, 2021

(54) AUTONOMOUSLY ACTING ROBOT EXHIBITING SHYNESS

(71) Applicant: GROOVE X, Inc., Tokyo (JP)

(72) Inventor: Kaname Hayashi, Tokyo (JP)

(73) Assignee: GROOVE X, INC., Tokyo (JP)

(*) Notice: Subject to any disclaimer, the term of this patent is extended or adjusted under 35 U.S.C. 154(b) by 488 days.

(21) Appl. No.: 16/147,879

(22) Filed: Oct. 1, 2018

(65) Prior Publication Data

US 2019/0030723 A1 Jan. 31, 2019

Related U.S. Application Data

(63) Continuation of application No. PCT/JP2017/010612, filed on Mar. 16, 2017.

(30) Foreign Application Priority Data

Apr. 8, 2016 (JP) .............................. JP2016-078051

(51) Int. Cl.
*B25J 11/00* (2006.01)
*B25J 9/16* (2006.01)
*B25J 5/00* (2006.01)
*B25J 13/00* (2006.01)

(52) U.S. Cl.
CPC ........... *B25J 11/001* (2013.01); *B25J 9/1664* (2013.01); *B25J 11/0015* (2013.01)

(58) Field of Classification Search
CPC ... B25J 11/001; B25J 11/0005; B25J 11/0015; B25J 9/1664; B25J 9/1694; B25J 13/08; B25J 9/163; A63H 2200/00; A63H 13/04; A63H 3/48; G06N 3/008; G05D 2201/0214

See application file for complete search history.

(56) References Cited

U.S. PATENT DOCUMENTS 6,565,371 B1 5/2003 Watanabe
6,616,464 B1 9/2003 Tosaka
(Continued)

FOREIGN PATENT DOCUMENTS

CN 1310659 A 8/2001
CN 1802239 A 7/2006
(Continued)

OTHER PUBLICATIONS

Written Opinion of the ISA in PCT/JP2017/010612, dated Jun. 6, 2017, 17pp.
(Continued)

*Primary Examiner* — Khoi H Tran
*Assistant Examiner* — Tanner L Cullen
(74) *Attorney, Agent, or Firm* — Hauptman Ham, LLP

(57) ABSTRACT

Empathy toward a robot is increased by the robot emulating human-like or animal-like behavior. A robot includes a movement determining unit that determines a direction of movement, a drive mechanism that executes a specified movement, and a familiarity managing unit that updates familiarity with respect to a moving object. The robot moves away from a user with low familiarity, and approaches a user with high familiarity. Familiarity changes in accordance with a depth of involvement between a user and the robot.

20 Claims, 6 Drawing Sheets

(56) References Cited

U.S. PATENT DOCUMENTS

| | | | |
|---|---|---|---|
| 2002/0013641 A1* | 1/2002 | Nourbakhsh | G06N 3/008 700/245 |
| 2002/0035405 A1 | 3/2002 | Yokoo et al. | |
| 2002/0049515 A1 | 4/2002 | Osawa | |
| 2002/0052672 A1* | 5/2002 | Osawa | G06N 3/008 700/245 |
| 2002/0081937 A1 | 6/2002 | Yamada et al. | |
| 2003/0109959 A1 | 6/2003 | Tajima et al. | |
| 2006/0196003 A1 | 9/2006 | Song et al. | |
| 2006/0293786 A1 | 12/2006 | Baba et al. | |
| 2007/0198128 A1 | 8/2007 | Ziegler et al. | |
| 2008/0221730 A1* | 9/2008 | Sakata | G06N 3/004 700/245 |
| 2009/0271031 A1* | 10/2009 | Kwon | G06N 3/008 700/245 |
| 2012/0316677 A1 | 12/2012 | Sato | |
| 2013/0123987 A1 | 5/2013 | Kase et al. | |
| 2015/0321094 A1* | 11/2015 | Wei | A63F 13/02 463/31 |
| 2017/0190051 A1* | 7/2017 | O'Sullivan | G06N 20/00 |
| 2018/0081365 A1* | 3/2018 | Asukai | B25J 11/0005 |
| 2018/0333862 A1 | 11/2018 | Hayashi | |

FOREIGN PATENT DOCUMENTS

| | | |
|---|---|---|
| CN | 1830375 A | 9/2006 |
| CN | 102902271 A | 1/2013 |
| DE | 112017001573 T5 | 12/2018 |
| JP | 2000-323219 A | 11/2000 |
| JP | 2000-326274 A | 11/2000 |
| JP | 2002-137182 A | 5/2002 |
| JP | 2002-307354 A | 10/2002 |
| JP | 2003-311028 A | 11/2003 |
| JP | 2009-72910 A | 4/2009 |
| JP | 2011-681 A | 1/2011 |
| WO | 00/67959 A1 | 11/2000 |
| WO | 2011/077730 A1 | 6/2011 |

OTHER PUBLICATIONS

Office Action in German Application No. 112017001874.9, dated Dec. 3, 2019. 14pp.

International Search Report in PCT/JP2017/010612, dated Jun. 6, 2017, 4pp.

Office Action in JP Application No. 2017-557015, dated Mar. 6, 2018, 6pp.

Office Action in CN Application No. 201780020525.3, dated Jan. 5, 2021. 16pp.

* cited by examiner

*FIG. 6*

| ID | FAMILIARITY | IMPORTANCE |
|---|---|---|
| 01 (DAD) | 70 | 1 |
| 02 (MOM) | 84 | 1 |
| 03 (SMALL CHILD) | 63 | 1 |
| 04 (CAT) | 90 | 1 |
| 05 (MOTHER-IN-LAW) | 47 | 0.5 |
| 06 (MOM'S FRIEND) | 30 | 0 |
| 07 (SMALL CHILD) | −30 | 0 |
| ⋮ | ⋮ | ⋮ |

216

AUTONOMOUSLY ACTING ROBOT EXHIBITING SHYNESS

RELATED APPLICATIONS

The present application is a continuation of International Application No. PCT/JP2017/010612, filed Mar. 16, 2017, which claims priority from Japanese Application No. 2016-078051, filed Apr. 8, 2016, the disclosures of which application are hereby incorporated by reference herein in their entirety.

FIELD

The present disclosure relates to a robot that autonomously selects an action in accordance with an internal state or an external environment.

BACKGROUND

A human acquires various items of information from an external environment via sensory organs, and selects an action. There are times when an action is consciously selected, and times when an action is subconsciously selected. A repeated action becomes a subconscious action in time, and a new action remains in a consciousness region.

A human believes that he or she has a will to freely select an action by him or herself, that is, a free will. That a human feels emotions of affection or enmity toward another person is because he or she believes that the other person also has a free will. A person who has free will, or at least an existence that can be supposed to have a free will, is also an existence that eases a person's sadness.

A reason a human keeps a pet is that the pet provides solace, rather than whether or not the pet is useful to the human. Exactly because a pet is an existence that to a greater or lesser degree creates an impression of having a free will, the pet can become a good companion to a human.

Meanwhile, for various reasons such as not being able to secure sufficient time to look after a pet, not having a living environment in which a pet can be kept, having an allergy, or hating the thought of being parted by death, there are many people who give up on keeping a pet. A robot that performs the role of a pet may provide people who cannot keep a pet with the kind of solace that a pet provides (refer to JP-A-2000-323219).

SUMMARY

Although robot technology has advanced swiftly in recent years, the technology has not produced a presence as a pet-like companion. The inventors believe that this is because people do not consider a robot as having a free will. A human, by observing an action such that it can only be thought that a pet has a free will, feels the existence of a free will in the pet, empathizes with the pet, and is given solace by the pet.

The inventors believe that if there were a robot that can emulate a human-like or animal-like action, in other words, a robot that can autonomously select a human-like or animal-like action, empathy toward the robot could be greatly increased.

Embodiments of the invention, having been contrived based on a recognition of the above description, has an object of providing action control technology for increasing empathy toward a robot.

An autonomously acting robot in one aspect of the invention includes a movement determining unit that determines a direction of movement, a drive mechanism that executes a specified movement, and a familiarity managing unit that updates familiarity with respect to a moving object.

When detecting a first moving object for which familiarity lower than a first threshold is set, the movement determining unit determines a direction away from the first moving object as a direction of movement.

An autonomously acting robot in another aspect of the invention includes a movement determining unit that determines a direction of movement, a drive mechanism that executes a specified movement, and a familiarity managing unit that updates familiarity with respect to a moving object.

When detecting a moving object for which familiarity higher than a predetermined threshold is set, the movement determining unit determines a direction approaching the moving object as a direction of movement.

An autonomously acting robot in another aspect of the invention includes a recognizing unit that detects a moving object, and determines whether or not the moving object is a target of a shyness action based on a predetermined determination reference, an operation determining unit that selects a shyness action when the moving object is a target of the shyness action, and a drive mechanism that executes the selected shyness action.

According to embodiments of the invention, empathy toward a robot is easily increased.

BRIEF DESCRIPTION OF THE DRAWINGS

FIG. 6 is a diagram showing a familiarity-related data structure of an individual data storage unit.

DETAILED DESCRIPTION OF THE INVENTION

Figure 1A:
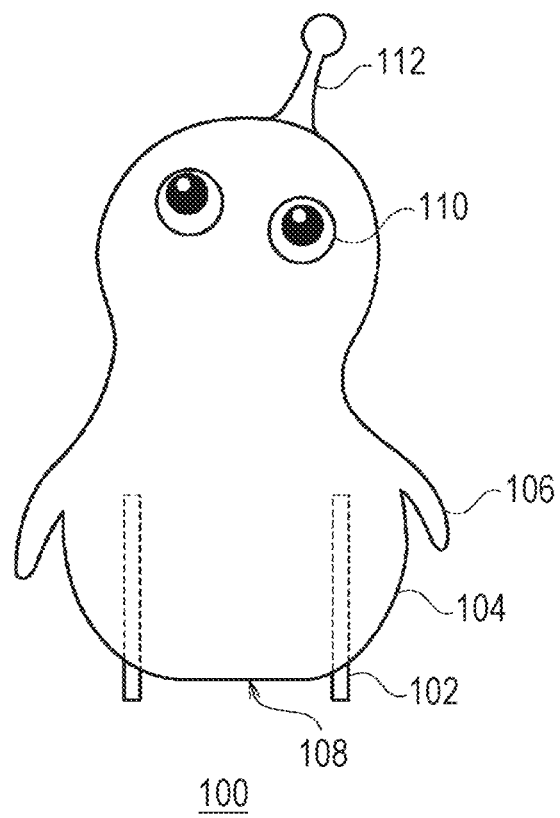
FIG. 1A is a front external view of a robot.
Figure 1B:
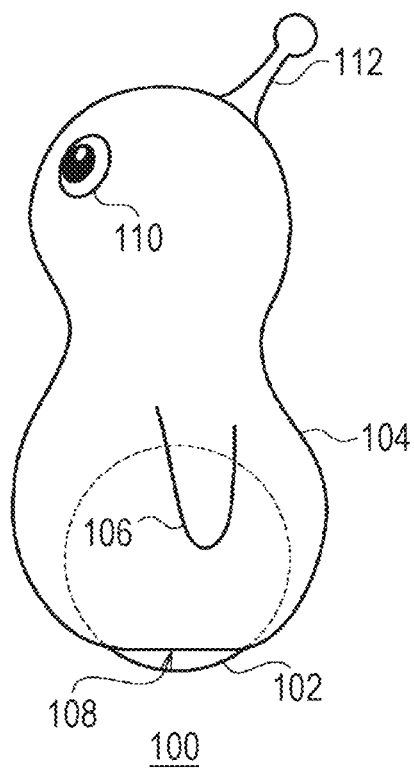
FIG. 1B is a side external view of the robot.

FIG. 1A is a front external view of a robot 100. FIG. 1B is a side external view of the robot 100.

The robot 100 in at least one embodiment is an autonomously acting robot that determines an action or gesture based on an external environment and an internal state. The external environment is recognized using various kinds of sensors, such as a camera or a thermosensor. The internal state is quantified as various parameters that express emotions of the robot 100. These will be described hereafter.

With indoor action as a precondition, the robot 100 of at least one embodiment has, for example, an interior of an owner's home as an action range. Hereafter, a human involved with the robot 100 will be called a "user", and a user forming a member of a home to which the robot 100 belongs will be called an "owner".

A body 104 of the robot 100 has a rounded form all over, and is formed of a soft material having elasticity, such as urethane, rubber, or resin. The robot 100 may be clothed. By the body 104, which is rounded, soft, and pleasant to touch, being adopted, the robot 100 provides a user with a sense of security and a pleasant tactile sensation.

A total weight of the robot 100 is 15 kilograms or less. In at least one embodiment, the total weight of the robot 100 is 10 kilograms or less. In at least one embodiment the total weight of the robot 100 is 5 kilograms or less. A majority of babies start to walk by themselves 13 months after birth. An average weight of a baby 13 months after birth is a little over 9 kilograms for boys, and a little under 9 kilograms for girls. Because of this, when the total weight of the robot 100 is 10 kilograms or less, a user can hold the robot 100 with an effort practically equivalent to that of holding a baby that cannot walk unassisted.

An average weight of a baby less than 2 months afterbirth is less than 5 kilograms for both boys and girls. Consequently, when the total weight of the robot 100 is 5 kilograms or less, a user can hold the robot 100 with an effort practically equivalent to that of holding a very young baby.

Advantages of a user holding the robot 100 easily, and wanting to hold the robot 100, are realized by the attributes of appropriate weight and roundness, softness, and pleasantness of touch. For the same reasons, a height of the robot 100 is 1.2 meters or less. In at least one embodiment, the height of the robot 100 is 0.7 meters or less.

Being able to be held is a concept of the robot 100 in at least one embodiment.

The robot 100 moves using a wheel 102. A rotational speed and a direction of rotation of two of the wheel 102 can be individually controlled. Also, the wheel 102 can also be slid upward in an interior of the body 104 of the robot 100, and completely stored in the body 104. A greater portion of the wheel 102 is hidden by the body 104 when traveling too, but when the wheel 102 is completely stored in the body 104, the robot 100 is in a state of being unable to move (hereafter called a "sitting state"). In the sitting state, a flat seating face 108 is in contact with a floor surface.

The robot 100 has two arms 106. The arms 106 do not have a function of gripping an object. The arms 106 can perform simple actions such as raising, waving, and oscillating. The two arms 106 can also be controlled individually.

A camera is incorporated in an eye 110. The eye 110 is also capable of an image display using a liquid crystal element or an organic EL element. In addition to the camera incorporated in the eye 110, various sensors, such as a highly directional microphone or an ultrasonic sensor, are mounted in the robot 100. Also, a speaker is incorporated, and the robot 100 is also capable of simple speech.

A horn 112 is attached to a head portion of the robot 100. As the robot 100 is lightweight, as heretofore described, a user can also lift up the robot 100 by grasping the horn 112.

Figure 2:
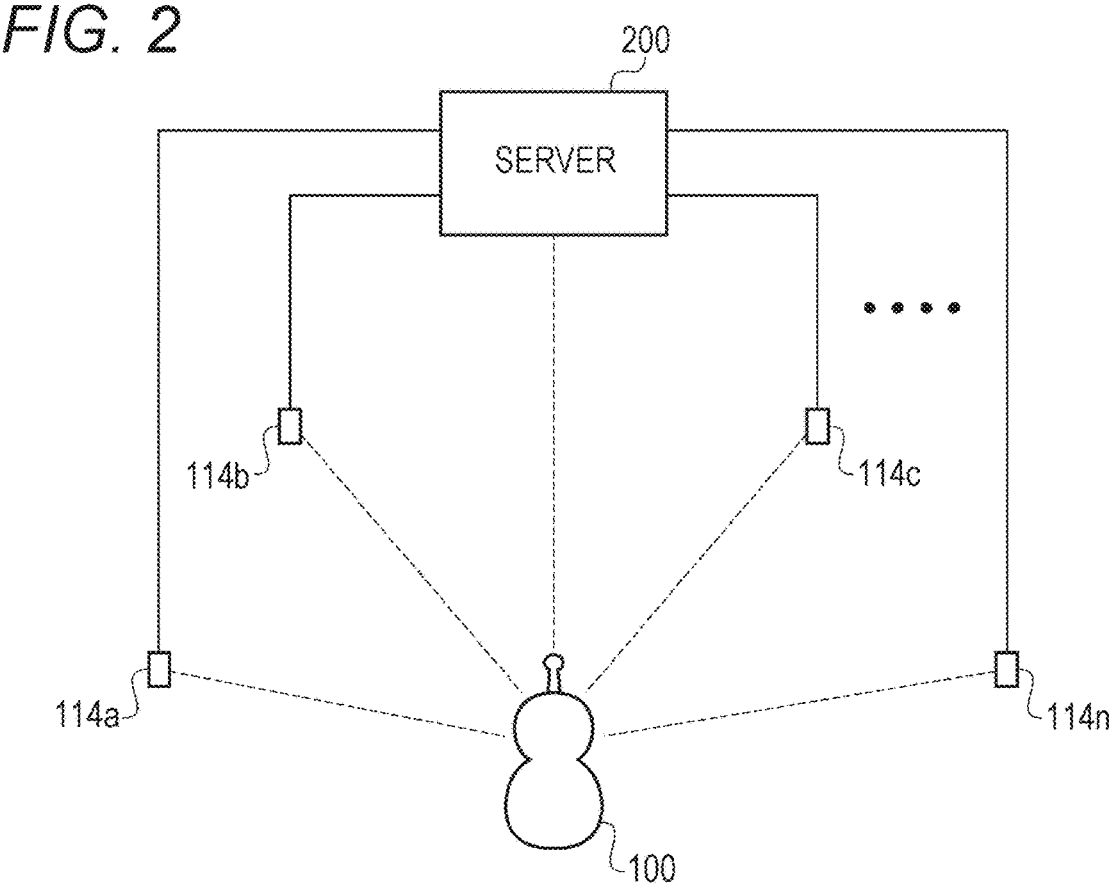
FIG. 2 is a configuration diagram of a robot system.

FIG. 2 is a configuration diagram of a robot system 300.

The robot system 300 includes the robot 100, a server 200, and a multiple of external sensors 114. The multiple of external sensors 114 (external sensors 114a, 114b, and so on to 114n) are installed in advance in a house. The external sensor 114 may be fixed to a wall surface of the house, or may be placed on a floor. Positional coordinates of the external sensor 114 are registered in the server 200. The positional coordinates are defined as x, y coordinates in the house envisaged to be an action range of the robot 100.

The server 200 is installed in the house. The server 200 and the robot 100 in at least one embodiment correspond one-to-one. The server 200 determines a basic action of the robot 100 based on information obtained from the sensors incorporated in the robot 100 and the multiple of external sensors 114.

The external sensor 114 is for reinforcing sensory components of the robot 100, and the server 200 is for reinforcing processing power of the robot 100.

The external sensor 114 regularly transmits a wireless signal (hereafter called a "robot search signal") including ID (hereafter called "beacon ID") of the external sensor 114. On receiving the robot search signal, the robot 100 returns a wireless signal (hereafter called a "robot response signal") including beacon ID. The server 200 measures a time from the external sensor 114 transmitting the robot search signal until receiving the robot response signal, and measures a distance from the external sensor 114 to the robot 100. By measuring the distance between each of the multiple of external sensors 114 and the robot 100, the server 200 identifies the positional coordinates of the robot 100.

Of course, a method whereby the robot 100 regularly transmits positional coordinates to the server 200 may also be adopted.

Figure 3:
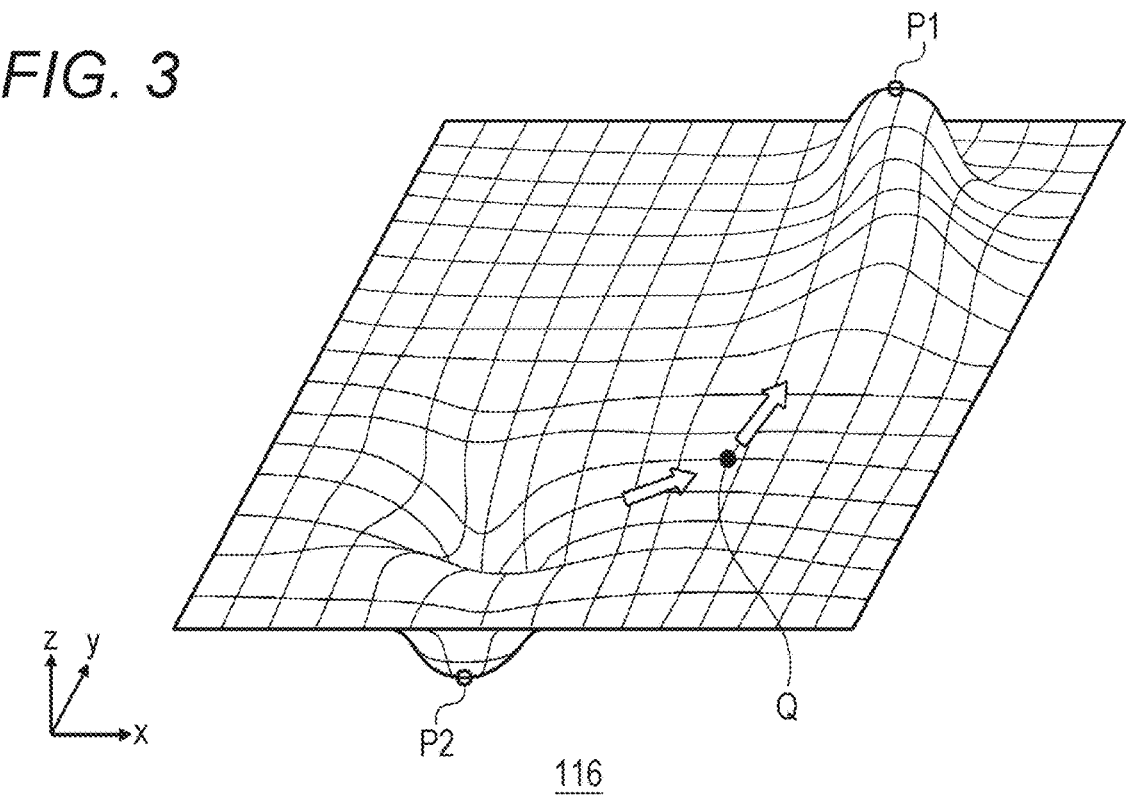
FIG. 3 is a schematic view of an emotion map.

FIG. 3 is a schematic view of an emotion map 116.

The emotion map 116 is a data table stored in the server 200. The robot 100 selects an action in accordance with the emotion map 116. The emotion map 116 shown in FIG. 3 shows a magnitude of an emotional attraction or aversion toward a place of the robot 100. An x axis and a y axis of the emotion map 116 indicate two-dimensional spatial coordinates. A z axis indicates a magnitude of an emotional attraction or aversion. When a z value is a positive value, an attraction toward the place is high, and when the z value is a negative value, the robot 100 is averse to the place.

On the emotion map 116 of FIG. 3, a coordinate P1 is a point in an indoor space managed by the server 200 as the action range of the robot 100 at which an emotion of attraction is high (hereafter called a favored point). The favored point may be a "safe place", such as behind a sofa or under a table, or may be a place in which people tend to gather or a lively place, like a living room. Also, the safe place may be a place where the robot 100 was gently stroked or touched in the past.

A definition of what kind of place the robot 100 favors is arbitrary, but the favored place is generally a place that is favored by small children, or by small animals such as dogs or cats, is set as a favored point.

A coordinate P2 is a point at which an emotion of aversion is high (hereafter called a "disliked point"). The disliked point may be a place where there is a loud noise, such as near a television, a place where there is likely to be a leak, like a bathroom or a washroom, an enclosed space or a dark place, a place where the robot 100 has been roughly treated by a user and that invokes an unpleasant memory, or the like.

A definition of what kind of place the robot 100 dislikes is also arbitrary, but the disliked place is generally a place feared by small children, or by small animals such as dogs or cats, is set as a disliked point.

A coordinate Q indicates a current position of the robot 100. The server 200 identifies position coordinates of the robot 100, using the robot search signal regularly transmitted by the multiple of external sensors 114 and the robot response signal responding to the robot search signal. For example, when the external sensor 114 with beacon ID=1 and the external sensor 114 with beacon ID=2 each detect the robot 100, the server 200 obtains the distances of the robot 100 from the two external sensors 114, and obtains the positional coordinates of the robot 100 from the distances.

In at least one embodiment, the external sensor 114 with beacon ID=1 transmits the robot search signal in a multiple of directions, and the robot 100 returns the robot response signal when receiving the robot search signal. By so doing, the server 200 may ascertain in which direction, and at what distance, the robot 100 is from which external sensor 114. Also, in at least one embodiment, the server 200 may calculate a distance moved by the robot 100 from the rotational speed of the wheel 102, thereby identifying the current position, or may identify the current position based on an image obtained from the camera.

When the emotion map 116 shown in FIG. 3 is provided, the robot 100 moves in a direction toward the favored point (coordinate P1), or in a direction away from the disliked point (coordinate P2).

The emotion map 116 changes dynamically. When the robot 100 arrives at the coordinate P1, the z value (emotion of attraction) at the coordinate P1 decreases with the passing of time. Because of this, the robot 100 can emulate animal-like behavior of arriving at the favored point (coordinate P1), "being emotionally satisfied", and in time "getting bored" with the place. In the same way, the emotion of aversion at the coordinate P2 is alleviated with the passing of time. A new favored point or disliked point appears together with the elapse of time, because of which the robot 100 carries out a new action selection. The robot 100 has "interest" in a new favored point, and ceaselessly carries out a new action selection.

The emotion map 116 expresses emotional swings as an internal state of the robot 100. The robot 100 heads for a favored point, avoids a disliked point, stays for a while at the favored point, and in time performs the next action. With this kind of control, the action selection of the robot 100 can be a human-like or animal-like action selection.

Maps that affect an action of the robot 100 (hereafter collectively called "action maps") are not limited to the type of emotion map 116 shown in FIG. 3. For example, various action maps such as curiosity, a desire to avoid fear, a desire to seek safety, and a desire to seek physical ease such as quietude, low light, coolness, or warmth, can be defined. Further, an objective point of the robot 100 may be determined by taking a weighted average of the z values of each of a multiple of action maps.

The robot 100 may also have, in addition to an action map, parameters that indicate a magnitude of various emotions or senses. For example, when a value of a sadness emotion parameter is increasing, a weighting coefficient of an action map that evaluates places in which the robot 100 feels at ease may be set high, and the value of this emotion parameter reduced by the robot 100 reaching a target point. In the same way, when a value of a parameter indicating a sense of boredom is increasing, a weighting coefficient of an action map that evaluates places in which curiosity is satisfied is set high.

Figure 4:
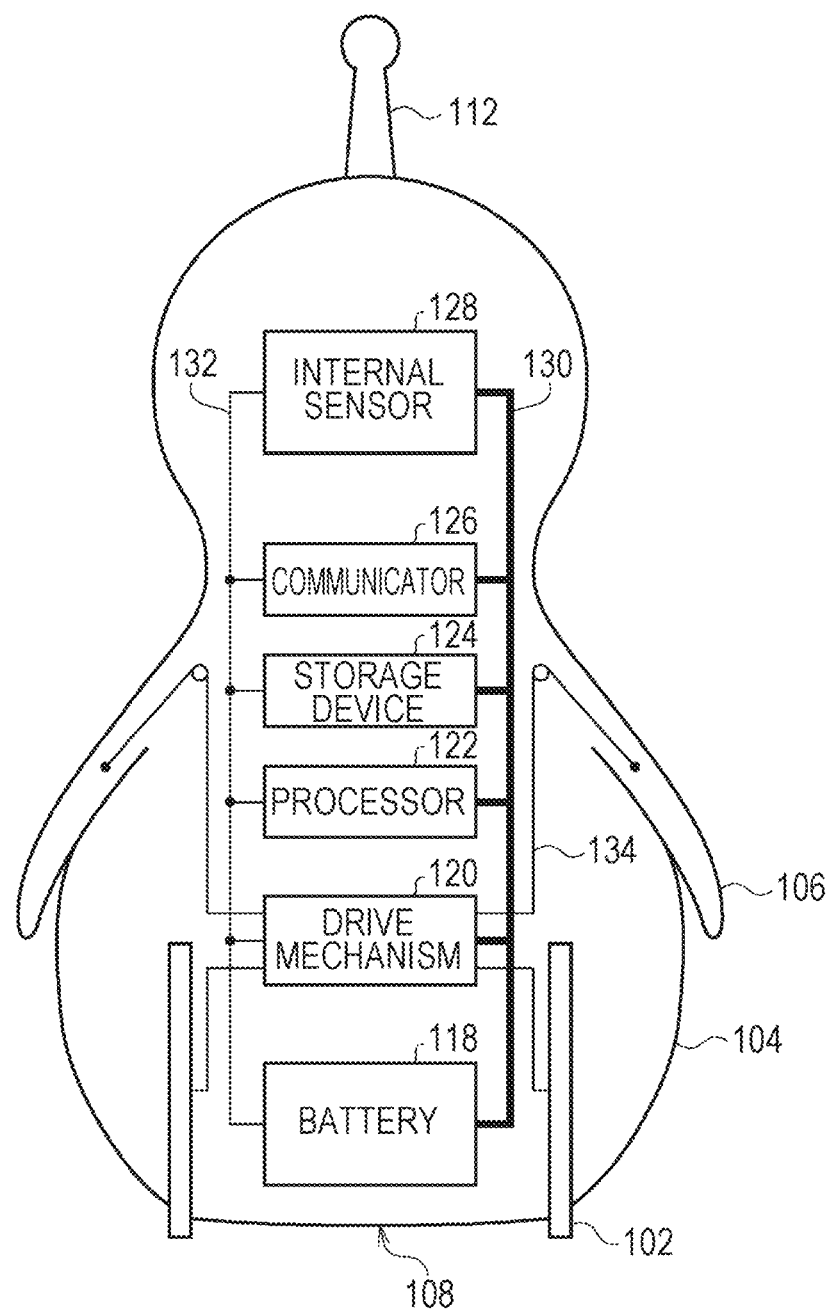
FIG. 4 is a hardware configuration diagram of the robot.

FIG. 4 is a hardware configuration diagram of the robot 100.

The robot 100 includes an internal sensor 128, a communicator 126, a storage device 124, a processor 122, a drive mechanism 120, and a battery 118. The units are connected to each other by a power line 130 and a signal line 132. The battery 118 supplies power to each unit via the power line 130. Each unit transmits and receives a control signal via the signal line 132. The battery 118 is a rechargeable battery such as a lithium ion rechargeable battery, and is a power source of the robot 100.

The internal sensor 128 is a collection of various kinds of sensor incorporated in the robot 100. Specifically, the internal sensor 128 is a camera, a highly directional microphone, an infrared sensor, a thermosensor, a touch sensor, an acceleration sensor, a smell sensor, and the like. The smell sensor is an already known sensor that applies a principle that electrical resistance changes in accordance with an adsorption of a molecule forming a source of a smell. The smell sensor classifies various smells into multiple kinds of category (hereafter called "smell categories").

The communicator 126 is a communication module that carries out wireless communication with the server 200 and various kinds of external device, such as the external sensor 114 and a mobile device possessed by a user, as a target. The storage device 124 is configured of a non-volatile memory and a volatile memory, and stores a computer program and various kinds of setting information. The processor 122 is means of executing a computer program. The drive mechanism 120 is an actuator that controls various mechanisms, such as the wheels 102 and the arms 106.

In addition to this, an indicator, a speaker, and the like are also mounted in the robot 100.

The processor 122 selects an action of the robot 100 while communicating with the server 200 or the external sensor 114 via the communicator 126. Various kinds of external information obtained by the internal sensor 128 also affect the action selection. The drive mechanism 120 mainly controls the wheel 102 and the arm 106. The drive mechanism 120 changes a direction of movement and a movement speed of the robot 100 by changing the rotational speed and the direction of rotation of each of the two wheels 102. Also, the drive mechanism 120 can also raise and lower the wheel 102. When the wheel 102 rises, the wheel 102 is completely stored in the body 104, and the robot 100 comes into contact with a floor surface via the seating face 108, taking on the sitting state.

The arm 106 can be lifted up by the drive mechanism 120 pulling the arm 106 via a wire 134. A gesture like an arm waving can also be performed by the arm 106 being caused to oscillate. A more complex gesture can also be represented by a large number of the wire 134 being utilized. That is, as the number of wires 134 in arm 106 complexity of possible gestures by arm 106 increases.

Figure 5:
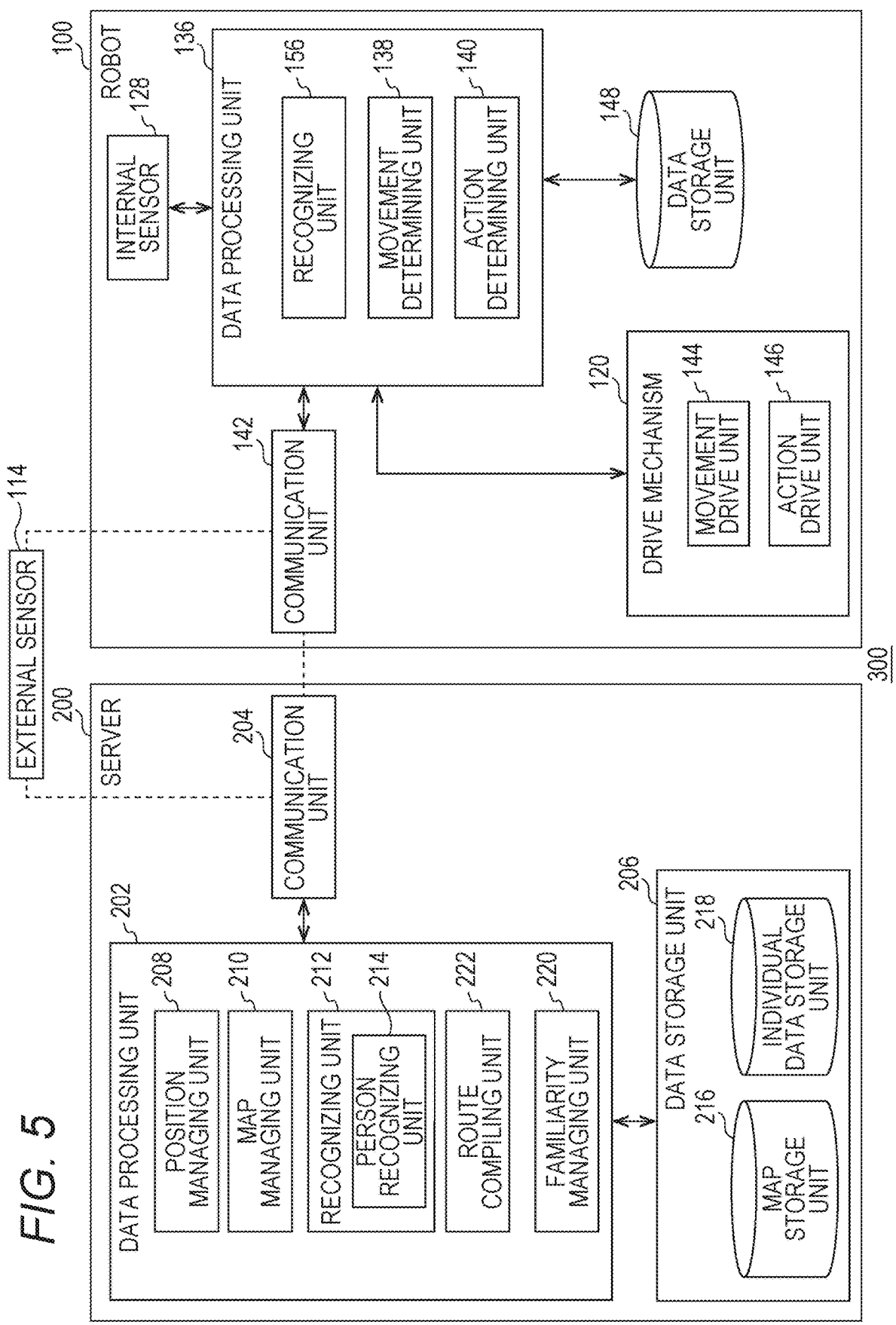
FIG. 5 is a functional block diagram of the robot system.

FIG. 5 is a functional block diagram of a robot system 300.

As heretofore described, the robot system 300 includes the robot 100, the server 200, and the multiple of external sensors 114. Each component of the robot 100 and the server 200 is realized by hardware including a computer formed of a CPU (central processing unit), various kinds of coprocessor, and the like, a storage device that is a memory or storage, and a wired or wireless communication line that links the computer and the storage device, and software that is stored in the storage device and supplies a processing command to the computer. A computer program may be configured of a device driver, an operating system, various kinds of application program positioned in an upper layer thereof, and a library that provides a common function to the programs. Each block described hereafter indicates a functional unit block rather than a hardware unit configuration.

One portion of the functions of the robot 100 may be realized by the server 200, and one portion or all of the functions of the server 200 may be realized by the robot 100.

Server 200

The server 200 includes a communication unit 204, a data processing unit 202, and a data storage unit 206. The communication unit 204 manages a process of communicating with the external sensor 114 and the robot 100. The data storage unit 206 stores various kinds of data. The data processing unit 202 executes various kinds of process based on data acquired by the communication unit 204 and data stored in the data storage unit 206. The data processing unit 202 also functions as an interface of the communication unit 204 and the data storage unit 206.

The data storage unit 206 includes a map storage unit 216 and an individual data storage unit 218. The map storage unit 216 stores a multiple of action maps. The individual data storage unit 218 stores information on a user, and in particular, on an owner. Specifically, the individual data storage unit 218 stores various kinds of parameter such as familiarity toward a user, and physical characteristics and behavioral characteristics of a user. The individual data storage unit 218 may also store other attribute information such as age and gender. Details will be described hereafter.

The robot 100 identifies a user based on the physical characteristics and the behavioral characteristics of the user. The robot 100 constantly captures a periphery using the incorporated camera. Further, the robot 100 extracts the physical characteristics and the behavioral characteristics of a person appearing in an image. The physical characteristics may be visual characteristics inherent to a body, such as a height, clothes worn by choice, a presence or absence of spectacles, a skin gloss, a hair color, or an ear size, or may also include other characteristics such as an average body temperature, a smell, or a voice quality. The behavioral characteristics, specifically, are characteristics accompanying behavior, such as a place the user favors, a briskness of movement, and a presence or absence of smoking. For example, the robot 100 extracts behavioral characteristics such that an owner identified as a father is often out of the home, and is often motionless on a sofa when at home, but a mother is often in a kitchen, and an activity range is broad.

The robot 100 clusters users appearing with a high frequency as "owners" based on physical characteristics and behavioral characteristics obtained from a large amount of image information and other sensing information.

Although a method of identifying a user from user ID is simple and reliable, the user having a device that can provide user ID is a precondition. Meanwhile, the method of identifying a user from physical characteristics or behavioral characteristics is such that an image recognition process is weighty, but there is an advantage in that even a user who does not have a mobile device can be identified. One of the two methods may be employed alone, or user identification may be carried out using the two methods together in a complementary way.

In at least one embodiment, users are clustered based on physical characteristics and behavioral characteristics, and a user is identified using deep learning (a multilayer neural network). Details will be described hereafter.

The robot 100 has a familiarity internal parameter for each user. When the robot 100 recognizes an action indicating a liking toward the robot 100, such as picking the robot 100 up or speaking to the robot 100, familiarity with respect to that user increases. Familiarity decreases with respect to a user not involved with the robot 100, a user who behaves roughly, or a user met infrequently.

The data processing unit 202 includes a position managing unit 208, a map managing unit 210, a recognizing unit 212, a route compiling unit 222, and a familiarity managing unit 220.

The position managing unit 208 identifies the positional coordinates of the robot 100 using the method described using FIG. 2. Also, the position managing unit 208 may also track positional coordinates of a user in real time.

The map managing unit 210 selects one of a multiple of action maps, and decides the direction of movement of the robot 100 based on the z value of the selected action map. The map managing unit 210 may also decide the direction of movement of the robot 100 by taking a weighted average of the z values of the multiple of action maps.

For example, it is assumed that the z values at a coordinate R1 and a coordinate R2 on an action map A are 4 and 3, and the z values at the coordinate R1 and the coordinate R2 on an action map B are −1 and 3. When taking a simple average, the total z value at the coordinate R1 is 4−1=3, and the total z value at the coordinate R2 is 3+3=6, because of which the robot 100 heads in the direction of the coordinate R2 rather than the coordinate R1.

When the action map A is weighted 5 times with respect to the action map B, the total z value at the coordinate R1 is 4×5−1=19, and the total z value at the coordinate R2 is 3×5+3=18, because of which the robot 100 heads in the direction of the coordinate R1.

The recognizing unit 212 recognizes an external environment. Various kinds of recognition, such as recognition of weather or season based on temperature and humidity, and recognition of shelter (a safe area) based on an amount of light and temperature, are included in the recognition of the external environment. The recognizing unit 212 further includes a person recognizing unit 214. The person recognizing unit 214 recognizes a person from an image captured by the camera incorporated in the robot 100, and extracts the physical characteristics and behavioral characteristics of the person. Further, based on the physical characteristic information and the behavioral characteristic information registered in the individual data storage unit 218, the person recognizing unit 214 determines what person, such as a father, a mother, or an eldest son, the person captured, that is, the person the robot 100 is looking at, corresponds to.

In addition to a person, the person recognizing unit 214 also, for example, extracts characteristics of a cat or a dog that is a pet. Hereafter, a description will be given assuming that not only a person but also a pet is included as a user or an owner.

Furthermore, the person recognizing unit 214 recognizes various responsive actions performed with respect to the robot 100, and recognizes the actions as being pleasant or unpleasant actions (to be described hereafter).

The route compiling unit 222 compiles a route along which the robot 100 should move. The route compiling unit 222 compiles a multiple of candidate routes, and the robot 100 may select any of the routes. Route selection will be described hereafter.

The familiarity managing unit 220 manages familiarity for each user. As heretofore described, familiarity is registered as one portion of individual data in the individual data storage unit 218. Management of familiarity in the individual data storage unit 218 will be described hereafter in relation to FIG. 6.

Robot 100

The robot 100 includes a communication unit 142, a data processing unit 136, a data storing unit 148, a drive mechanism 120, and an internal sensor 128. The communication unit 142 corresponds to the communicator 126 (refer to FIG. 4), and manages a process of communicating with the external sensor 114 and the server 200. The data storing unit 148 stores various kinds of data. The data storing unit 148 corresponds to the storage device 124 (refer to FIG. 4). The data processing unit 136 executes various kinds of process based on data acquired by the communication unit 142 and data stored in the data storing unit 148. The data processing unit 136 corresponds to the processor 122 and a computer program executed by the processor 122. The data processing unit 136 also functions as an interface of the communication unit 142, the internal sensor 128, the drive mechanism 120, and the data storing unit 148.

The data processing unit 136 includes a recognizing unit 156, a movement determining unit 138, and an action determining unit 140.

The drive mechanism 120 includes a movement drive unit 144 and an action drive unit 146. The movement determining unit 138 decides a direction of movement of the robot 100. The movement drive unit 144 causes the robot 100 to head toward a target point by driving the wheels 102 in accordance with an instruction from the movement determining unit 138. The map managing unit 210 of the server 200 calculates a movement destination (target point) of the robot 100 in real time, based on an action map. The server 200 transmits the coordinates of the target point to the robot 100, and the movement determining unit 138 causes the robot 100 to move toward the target point.

Although an action map decides the main element of the direction of movement of the robot 100, the robot 100 of at least one embodiment can also carry out specific actions compliant with familiarity. These will be described hereafter.

The action determining unit 140 decides a gesture of the robot 100. Multiple gestures are defined in advance in the data storing unit 148. Specifically, a gesture of sitting by housing the wheel 102, a gesture of raising the arm 106, a gesture of causing the robot 100 to carry out a rotating action by causing the two wheels 102 to rotate in reverse or by causing only one wheel 102 to rotate, a gesture of shaking by causing the wheel 102 to rotate in a state in which the wheel 102 is housed, and the like are defined.

The action determining unit 140 can also perform a gesture of holding up both arms 106 as a gesture asking for "a hug" when a user with a high degree of familiarity is nearby, and can also perform a gesture of no longer wanting to be hugged by causing the wheel 102 to rotate in reverse in a housed state when bored of the "hug". The action drive unit 146 causes the robot 100 to perform various gestures by driving the wheel 102 and the arm 106 in accordance with an instruction from the action determining unit 140.

The recognizing unit 156 analyzes external information obtained from the internal sensor 128. The recognizing unit 156 is capable of visual recognition (a visual unit), smell recognition (an olfactory unit), sound recognition (an aural unit), and tactile recognition (a tactile unit).

The recognizing unit 156 regularly captures an outside environment using the incorporated camera (the internal sensor 128), and detects a user that is a moving object such as a person or a pet. Characteristics thereof are transmitted to the server 200, and the person recognizing unit 214 of the server 200 extracts the physical characteristics of the moving object. Also, the recognizing unit 156 also detects a smell of the user and a voice of the user. Smell and sound (voice) are classified into multiple kinds using an already known method. Also, the recognizing unit 156 can also detect a temperature when touched using an incorporated temperature sensor.

When a strong force is applied to the robot 100, the recognizing unit 156 recognizes this using an incorporated acceleration sensor, and the person recognizing unit 214 of the server 200 recognizes that a "violent action" has been performed by a user in the vicinity. When a user picks the robot 100 up by grabbing the horn 112, this may also be recognized as a violent action. When a user in a state of confronting the robot 100 speaks in a specific volume region and a specific frequency band, the person recognizing unit 214 of the server 200 may recognize that a "speaking action" has been performed with respect to the robot 100. Also, when a temperature in the region of body temperature is detected, the person recognizing unit 214 of the server 200 recognizes that a "touching action" has been performed by a user, and when upward acceleration is detected in a state in which touching is recognized, the person recognizing unit 214 of the server 200 recognizes that a "hug" has been performed. Physical contact when a user raises the body 104 may also be sensed, and a hug may also be recognized by a load acting on the wheel 102 decreasing.

In this way, the person recognizing unit 214 of the server 200 recognizes various kinds of response by a user toward the robot 100. "Pleasant" or "unpleasant" is correlated to one portion of typical responsive actions among these various kinds of responsive action. A series of recognition processes including detecting, analyzing, and determining may be carried out by the recognizing unit 212 of the server 200 alone, or carried out by the recognizing unit 156 of the robot 100 alone, or the two may execute the recognition processes while dividing roles.

The familiarity managing unit 220 of the server 200 changes the familiarity toward a user in accordance with a response recognized by the recognizing unit 156. Essentially, the familiarity toward a user who carries out a pleasant action increases, while the familiarity toward a user who carries out an unpleasant action decreases.

The recognizing unit 212 of the server 200 may determine whether a response is pleasant or unpleasant, and the map managing unit 210 may change the z value of the point at which the pleasant or unpleasant action has been carried out on an action map that represents "affection toward a place". For example, when a pleasant action is carried out in a living room, the map managing unit 210 may set a favored point at a high probability in the living room. In this case, a positive feedback advantage is realized in that the robot 100 favors the living room, and further favors the living room due to being the recipient of a pleasant action in the living room.

The route compiling unit 222 of the server 200 compiles as needed a movement route (hereafter called an "escape route") assuming a case in which an unknown person, that is, a moving object with low familiarity, is detected (hereafter called an "escape event"), with the current position of the robot 100 as an origin. In order to decide an escape route, at least (1) a selection of a final movement position (hereafter called a "movement ending position") and (2) a position from which movement is to be started (hereafter called a "movement starting position") are needed. When the movement ending position is sought, a route from the movement starting position to the movement ending position compiled, and a shift made to actual action, after the robot 100 detects an unknown person, time taken until action increases. Because of this, an escape action that should by rights be an immediate action becomes unnatural.

The route compiling unit 222 compiles as needed an escape route in accordance with the current position of the robot 100, even when no escape event has occurred. When an escape event occurs, the robot 100 can immediately take evasive action based on an escape route compiled in advance by the route compiling unit 222. It is sufficient that the movement starting position is the current position of the robot 100. The movement ending position may be an arbitrary position separated by a predetermined distance from the robot 100, or may be set in a vicinity of a user whose familiarity is of a predetermined value or greater.

The function of the route compiling unit 222 may be mounted in the robot 100 rather than in the server 200.

The map managing unit 210 compiles a map (hereafter called a "static map") recording a safe place, such as a position of furniture behind which the robot 100 can hide or a safe place, existing in a space in which the robot 100 exists, and stores the map in the map storage unit 216. Also, the map managing unit 210 compiles a map (hereafter called a "dynamic map") recording a position of a person with high familiarity who is in the space in which the robot 100 exists (normally in the same house), and stores the map in the map storage unit 216. The route compiling unit 222 may utilize the dynamic map with priority over the static map. Because of this, the robot 100 can prioritize an evasive action of hiding behind a person over hiding behind an object when an escape event occurs.

The route compiling unit 222 refers to the static map and the dynamic map saved in the map storage unit 216, and adopts a point nearest to the current position of the robot 100 as the movement ending position. Further, the route compiling unit 222 compiles as needed an escape route from the movement starting position to the movement ending position. The route compiling unit 222 may compile an escape route every time the robot 100 moves, or may compile an escape route regularly.

Shyness Function

FIG. 6 is a diagram showing a familiarity-related data structure of the individual data storage unit 218.

The person recognizing unit 214 of the server 200 detects a moving object from various kinds of data obtained from the external sensor 114 or the internal sensor 128, and extracts characteristics (physical characteristics and behavioral characteristics) thereof. Further, the person recognizing unit 214 cluster analyzes multiple moving objects based on these characteristics. Not only a human, but also a pet such as a dog or cat, may be a target of analysis as a moving object.

For example, the robot 100 regularly carries out image capturing, and the person recognizing unit 214 recognizes a moving object from the images, and extracts characteristics of the moving object. When a moving object is detected, physical characteristics and behavioral characteristics are also extracted from the smell sensor, the incorporated highly directional microphone, the temperature sensor, and the like. For example, when a moving object appears in an image, various characteristics are extracted, such as having a beard, being active early in the morning, wearing red clothing, smelling of perfume, having a loud voice, wearing spectacles, wearing a skirt, having gray hair, being tall, being plump, being suntanned, or being on a sofa.

When a moving object (user) having a beard is often active early in the morning (gets up early) and rarely wears red clothing, a first profile that is a cluster (user) that gets up early, has a beard, and does not often wear red clothing is created. Meanwhile, when a moving object wearing spectacles often wears a skirt, but the moving object does not have a beard, a second profile that is a cluster (user) that wears spectacles and wears a skirt, but definitely does not have a beard, is created.

Although the above is a simple example, the first profile corresponding to a father and the second profile corresponding to a mother are formed using the heretofore described method, and the robot 100 recognizes that there are at least two users (owners) in this house.

Note that the robot 100 does not need to recognize that the first profile is the "father". In all cases, it is sufficient that the robot 100 can recognize a figure that is "a cluster that has a beard, often gets up early, and hardly ever wears red clothing".

In FIG. 6, clustering of a multiple of users, those being Dad (01), Mom (02), a small child (03), a cat (04), a mother-in-law (05), Mom's friend (06), and a small child (07), is carried out using the heretofore described method. In FIG. 6, a label is allotted to a cluster (user), as in 01 to 07.

It is assumed that the robot 100 newly recognizes a moving object (user) in a state in which this kind of cluster analysis is completed.

At this time, the person recognizing unit 214 of the server 200 extracts characteristics from sensing information of an image or the like obtained from the robot 100, and determines which cluster a moving object near the robot 100 corresponds to. For example, when a moving object that has a beard is detected, the probability of the moving object being Dad (01) is high. When the moving object is active early in the morning, it is still more certain that the moving object corresponds to Dad (01). Meanwhile, when a moving object that wears spectacles is detected, there is a possibility of the moving object being Mom (02). When the moving object has a beard, the moving object is neither Mom (02) nor Dad (01), because of which the person recognizing unit 214 determines that the moving object is a new person who has not been cluster analyzed.

Formation of a cluster by characteristic extraction (cluster analysis) and application to a cluster accompanying characteristic extraction may be executed concurrently.

Familiarity toward a moving object (user) changes in accordance with how the robot 100 is treated by the user.

The familiarity managing unit 220 increases or reduces familiarity toward each clustered user. Familiarity mainly changes in accordance with (1) detection (visual recognition), (2) physical contact, and (3) speaking.

Familiarity will be described as something that changes within a range from −100 for a lowest familiarity, that is, an object of caution, to +100 for a highest familiarity, that is, safety. Behavior of the robot 100 toward a moving object changes in accordance with familiarity, which will be described hereafter. Firstly, a method of changing familiarity will be described.

1. Detection

When the small child (03) is detected in an image captured by the robot 100, the small child (03) is "visually recognized" by the robot 100. More specifically, when it is determined that the characteristics of the detected moving object correspond with the cluster (profile) of the small child (03), based on characteristic information obtained from the captured image and other characteristic information obtained from the smell sensor and the like when capturing, it is determined that there is visual recognition. When it is determined that there is visual recognition, the familiarity managing unit 220 increases the familiarity of the small child (03). The more frequently a user is detected, the more liable the familiarity is to increase.

According to this kind of control method, the robot 100 emulates animal-like behavior in being more liable to feel a sense of closeness toward a person frequently met.

Not being limited to simple detection, familiarity may also increase when "eyes meet". The recognizing unit 156 of the robot 100 may recognize a facial image of a confronting user, recognize a line of sight from the facial image, and recognize that "eyes have met" when the time for which the line of sight is directed toward the robot 100 is a predetermined time or greater.

2. Physical Contact

When the robot 100 recognizes a user, and detects a touch (physical contact) from the user, it is determined that interest in the robot 100 has been shown by the user, and familiarity increases. For example, when the robot 100 is touched by Mom (02), the familiarity managing unit 220 increases the familiarity of Mom (02). The robot 100 may detect a touching of the robot 100 by an outer shell being covered with a piezoelectric fabric. Touching may also be detected by the body temperature of the user being detected by the temperature sensor. When the robot 100 detects a hug, familiarity may be considerably increased on the basis that strong affection toward the robot 100 has been shown.

Meanwhile, when the robot 100 detects a violent action such as being kicked, being hit, or having the horn 112 grasped, the familiarity managing unit 220 reduces familiarity. For example, when the robot 100 is thrown by the small child (03), the familiarity managing unit 220 considerably reduces familiarity with respect to the small child (03).

According to this kind of control method, the robot 100 emulates animal-like behavior in being more liable to feel a sense of closeness toward a person who touches the robot 100 gently, but to dislike a violent person.

3. Speaking

Familiarity is also changed when the robot 100 detects speech directed toward the robot 100. For example, familiarity is increased when the robot 100 detects the name of the robot 100 or an affectionate term in a predetermined volume range. Typical terminological patterns such as "you're cute", "you're funny", or "come here" may be registered in advance as affectionate terms, and whether or not a term is an affectionate term may be determined using speech recognition. Meanwhile, familiarity may be reduced when the robot 100 is spoken to at a high volume exceeding a normal volume range. For example, familiarity is reduced when the robot 100 is scolded in a loud voice, or when surprised.

Also, familiarity may be reduced when an abusive term is directed at the robot 100. Typical terminological patterns such as "stop it", "stay away", "get away", or "idiot" may be registered in advance as abusive terms, and whether or not a term is an abusive term may be determined using speech recognition.

The name of the robot 100 may be registered in advance by a user. Alternatively, the robot 100 may recognize a term used with particular frequency among various terms directed at the robot 100 as being the name of the robot 100. In this case, terms generally liable to be used frequently, such as "hey" and "come here", may be eliminated from candidates for name recognition.

According to the heretofore described control method, the robot 100 sets a high familiarity for a frequently met person, a person who frequently touches the robot 100, and a person who frequently speaks to the robot 100. Meanwhile, familiarity decreases for a rarely seen person, a person who does not often touch the robot 100, a violent person, and a person who scolds in a loud voice. The robot 100 changes the familiarity of each user based on various items of outside environment information detected by the sensors (visual, tactile, and aural).

The familiarity managing unit 220 reduces familiarity with the passing of time. For example, the familiarity managing unit 220 may reduce the familiarity of all users by 1 each every 10 minutes. When a user does not continue to be involved with the robot 100, or in other words, when a user does not continue to treat the robot 100 kindly, the user cannot maintain an intimate relationship with the robot 100.

A rate of change of familiarity does not need to be constant. A region that is liable to increase or decrease (a high-sensitivity region) and a region that is unlikely to change (a low-sensitivity region) may be set based on an arbitrary function such as a sigmoid function. For example, setting can also be such that familiarity of 0 to 50 is comparatively likely to rise, but familiarity of 50 to 80 is unlikely to rise but likely to fall, and familiarity of 80 or more is unlikely to rise, but also unlikely to fall. According to this kind of setting, a "relationship of strong trust that is unlikely to be broken" can be expressed when familiarity exceeds 80.

A rate of increase and a rate of decrease of familiarity do not need to be of the same extent. For example, familiarity can be set so as to be unlikely to rise and likely to fall.

In addition to familiarity, "importance" is also set for each user (cluster). Importance is a parameter indicating a special relevance among users, such as an owner. In at least one embodiment, importance is normalized in a range of 0 to 1.

Importance=1 indicates a family member (owner), and 0 indicates a stranger. Also, an intermediate value of 0.5 is set when a person is not a stranger but cannot be said to be a family member, for example, the mother-in-law (05), who lives separately. Importance is a parameter, separate from familiarity, forming a guide for the robot 100 to recognize an existence that should be respected. Users are classified into a special group (owner's group) and a general group (stranger's group) in accordance with importance.

A user may set importance by inputting. For example, when importance=1 is set for the cluster that is "a person who has a beard and is often active early in the morning", Dad (01) will thereafter be treated as being in the special group. The familiarity managing unit 220 changes familiarity using differing algorithms for the special group and the general group.

The familiarity managing unit 220 sets the rate of decrease per unit time of familiarity to be low for a user in the special group. Also, the rate of increase of familiarity when receiving a pleasant action such as speaking or a hug may be set to be high, or control may be such that familiarity does not decrease to or below a certain value.

Meanwhile, the familiarity managing unit 220 sets the rate of decrease per unit time of familiarity to be high for a user in the general group. Also, familiarity when receiving a pleasant action such as physical contact may be set to be unlikely to rise, or control may be such that familiarity does not increase to or above a certain value. In this way, the rate of change of familiarity with the elapse of time, or accompanying a pleasant or unpleasant action, may be caused to differ between the special group and the general group.

In FIG. 6, the importance of the mother-in-law (05) is set at 0.5, representing importance greater than that of a stranger, but less than that of a family member. In this case, the rate of decrease of familiarity per unit time may be set to an intermediate setting greater than that of the special group, and smaller than that of the general group.

According to this kind of control method, a user with high importance can easily maintain familiarity, because of which a "family bond" can be expressed. For example, control can be such that familiarity is unlikely to decrease even in the case of Dad (01), who is often away from home on a business trip or the like, and familiarity recovers when the robot 100 is hugged by Dad (01) for the first time in a long time. Also, control can also be such that familiarity is unlikely to decrease sharply even when the robot 100 is roughly treated by the small child (03), who is a family member, but familiarity decreases sharply when the robot 100 is roughly treated by the separate small child (07), who is not a family member. In this way, discriminatory responses such that a reaction changes in accordance with importance, even when treated in the same way, can be realized.

In FIG. 6, the familiarity of Dad (01) is 70. Although there are few opportunities to detect Dad (01) due to work and business trips, a high familiarity may be set because Dad (01) frequently performs a pleasant action such as a hug. Mom (02) is easily detected owing to frequently being at home, and the familiarity of Mom (02) may be 80 because Mom (02) enthusiastically speaks to the robot 100. The small child (03) is a child of Dad (01) and Mom (02). Although there are many opportunities for detection and a large amount of involvement, the small child (03) may sometimes perform a violent action. Because of this, the familiarity with the small child (03) is 63. Also, the family keeps the cat (04). The cat (04) frequently plays with the robot 100, and cannot perform a violent action, because of which the familiarity is 90.

According to the above, the robot 100 can express by behavior a great liking for the cat (04) and a liking for Mom (02), but a slight wariness of the small child (03).

Meanwhile, the familiarity of the mother-in-law (05), who there are few opportunities to detect, is 47. Also, the familiarity of the violent small child (07) of the neighborhood, who is rarely met, is −30. Mom's friend (06), despite being kind, is not a family member (importance 0), and is rarely met, because of which the familiarity is restricted to 30.

According to the above, the robot 100 can express by behavior being accustomed to the mother-in-law (05) and Mom's friend (06), but hating the small child (07), who comes occasionally.

In this way, the familiarity of the robot 100 changes in real time in accordance with the importance of a user and involvement between the robot 100 and the user. The robot 100 can express an animal-like emotion of affection in favoring a person who has close involvement with the robot 100, while treating a family member as important. In other words, the robot 100 can express by behavior "shyness" in being wary of a violent person or a person the robot 100 does not know well.

Figure 7:
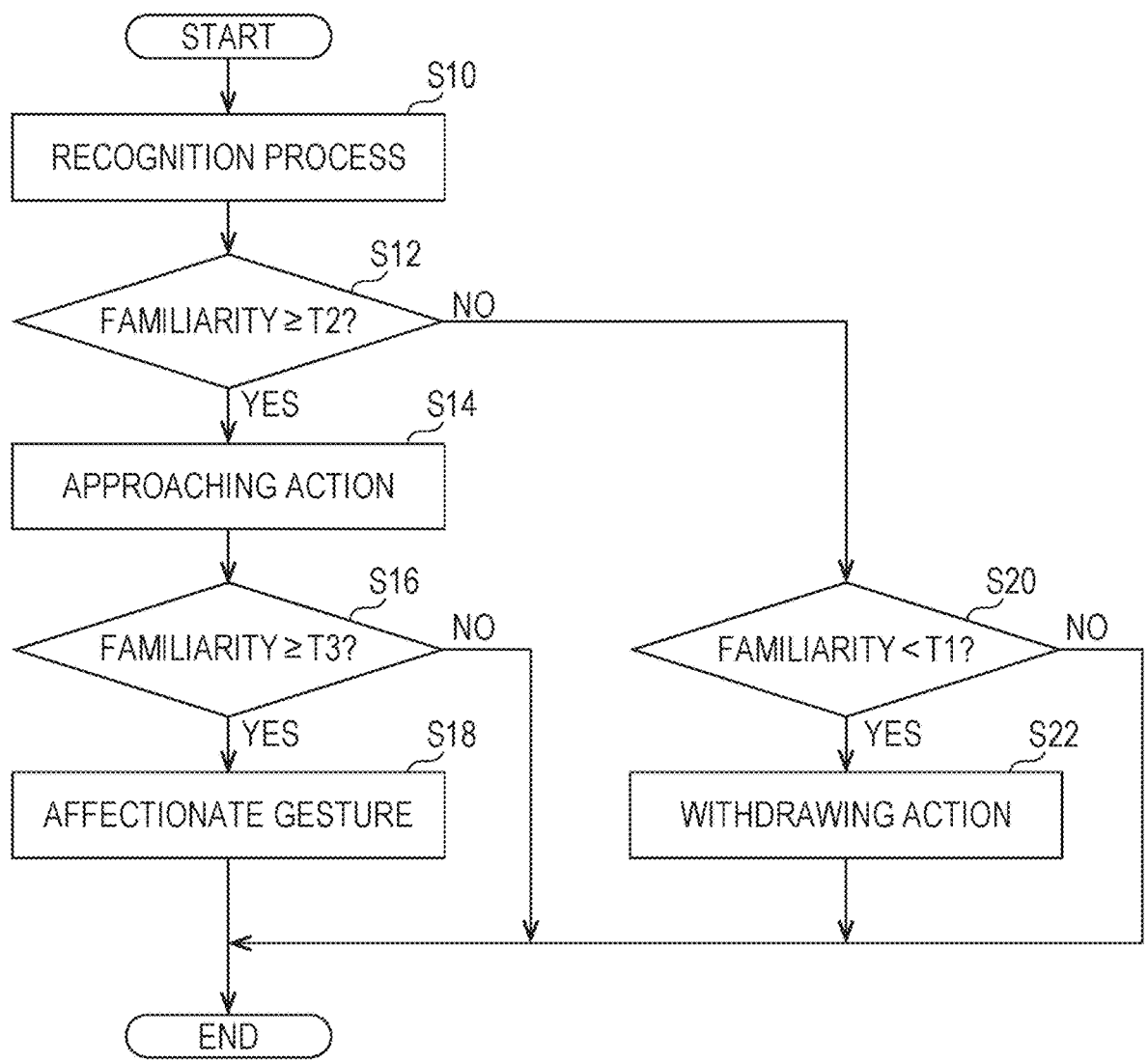
FIG. 7 is a flowchart showing an action pattern of the robot in accordance with familiarity.

FIG. 7 is a flowchart showing a behavioral pattern in accordance with familiarity of the robot 100.

As heretofore described, the actual robot 100 autonomously carries out a complex action selection in accordance with an action map. The robot 100 acts while being affected by a multiple of action maps based on various parameters such as loneliness, boredom, and curiosity. FIG. 7 schematically shows an action selection of the robot 100 accompanying familiarity toward a user. When the effect of the action maps is removed, or when in an internal state in which the effect of the action maps is small, the robot 100 essentially attempts to approach a person with high familiarity, and attempts to move away from a person with low familiarity.

Hereafter, a description will be given assuming that a threshold T1<T2<T3. Also, the description will be given assuming that cluster analysis has been sufficiently executed, and that multiple users (clusters) have been identified.

Firstly, the recognizing unit 156 of the robot 100 recognizes a user using the internal sensor 128 and the like, and the person recognizing unit 214 determines which cluster the user corresponds to (S10). When the familiarity of the user is the threshold T2 (an intermediate threshold) or greater (Y in S12), the movement determining unit 138 sets a direction approaching the user as the direction of movement, and the movement drive unit 144 executes an approaching action (S14).

Furthermore, when the familiarity of the user is the threshold T3 (an upper threshold) or greater (Y in S16), the action determining unit 140 instructs the action drive unit 146, thereby causing an affectionate gesture to be performed (S18). An affectionate gesture is a gesture indicating goodwill to a person specified in advance. For example, the robot 100 may assume a sitting state, and perform a gesture of raising both arms 106 as though to ask for a hug. Also, the robot 100 may perform a rotating action around the user, or may emit a peculiar peeping "call" from the incorporated speaker. Alternatively, the robot 100 may attempt to direct the user's attention to the robot 100 by enthusiastically bumping lightly against the user.

When the familiarity is less than the threshold T3 (N in S16), no affectionate gesture is performed.

Meanwhile, when the familiarity is less than the threshold T2 (the intermediate threshold) (N in S12), and moreover, the familiarity is less than the threshold T1 (a lower threshold) (Y in S20), the movement determining unit 138 sets a direction away from the user as the direction of movement, and the movement drive unit 144 executes a withdrawing action (S22).

When the familiarity of the cluster is less than the threshold T2 (the intermediate threshold) (N in S12) but equal to or greater than the threshold T1 (the lower threshold) (N in S20), no withdrawing action is executed.

To summarize, actions of the robot 100 are classified below in accordance with familiarity.

1. A cluster with extremely high familiarity (familiarity of the threshold T3 or greater)

The robot 100 strongly expresses a feeling of affection by carrying out an approaching action, and by performing an affectionate gesture.

2. A cluster with comparatively high familiarity (familiarity of the threshold T2 or greater, but less than T3)

The robot 100 carries out only an approaching action.

3. A cluster with comparatively low familiarity (familiarity of the threshold T1 or greater, but less than the threshold T2)

The robot 100 does not carry out any special action.

4. A cluster with particularly low familiarity (familiarity of less than the threshold T1)

The robot 100 carries out a withdrawing action.

According to the heretofore described control method, the robot 100 approaches the user when finding a user with high familiarity, and conversely, moves away from the user when finding a user with low familiarity. According to this kind of control method, the robot 100 can express by behavior a so-called "shyness". Also, when a visitor (a user A with low familiarity) appears, the robot 100 may move away from the visitor and head toward a family member (a user B with high familiarity). In this case, the user B can perceive that the robot 100 is shy and feeling uneasy, and relying on the user B. Owing to this kind of behavioral expression, pleasure at being chosen and relied upon, and an accompanying feeling of affection, are evoked in the user B.

Meanwhile, when the user A, who is a visitor, visits frequently, and speaks to and touches the robot 100, familiarity of the robot 100 toward the user A gradually rises, and the robot 100 ceases to perform an action of shyness (a withdrawing action) with respect to the user A. The user A can also feel affection toward the robot 100 by perceiving that the robot 100 has become accustomed to the user A.

The heretofore described action selection need not necessarily be executed constantly. For example, when an internal parameter indicating curiosity of the robot 100 is high, weight is given to an action map from which a place in which the curiosity is satisfied is obtained, because of which there is also a possibility that the robot 100 does not select an action affected by familiarity. Also, when the external sensor 114 installed in the hall detects the return home of a user, the robot 100 may execute an action of greeting the user with maximum priority.

Heretofore, the robot 100, and the robot system 300 including the robot 100, have been described based on an embodiment.

Action selection that cannot be patterned, is difficult to predict, and is animal-like, is expressed by using one or more action maps. Using this kind of method, animal-like action selection is emulated.

It is often the case that attachment to a pet arises from a feeling of being needed by and relied upon by the pet. The pet being fond of a user, and being shy with respect to an existence other than the user, is liable to trigger attachment to the pet by the user. Attachment of a user to the robot 100 can be strengthened by shyness, which is liable to cause a human to feel attachment to a pet, being realized in the robot 100 too.

The invention not being limited to the heretofore described at least one embodiment or a modified example, components can be changed or embodied without departing from the scope of the disclosure. Various implementations may be formed by a multiple of the components disclosed in the heretofore described at least one embodiment or the modified example being combined as appropriate. Also, some components may be eliminated from the total of components shown in the heretofore described at least one embodiment or the modified example.

Although a description has been given assuming that the robot system 300 is configured of one robot 100, one server 200, and the multiple of external sensors 114, one portion of the functions of the robot 100 may be realized by the server 200, and one portion or all of the functions of the server 200 may be allocated to the robot 100. One server 200 may control a multiple of the robot 100, or a multiple of the server 200 may control one or more of the robot 100 in cooperation.

A third device other than the robot 100 and the server 200 may manage one portion of functions. A collection of the functions of the robot 100 and the functions of the server 200 described in FIG. 5 can also be comprehensively grasped as one "information processing device". In at least one embodiment, a method of distributing the multiple of functions needed in order to realize the invention with respect to one or multiple items of hardware is determined with consideration to the processing capability of each item of hardware, specifications required of the robot system 300, and the like.

In this embodiment, it has been described that mainly the recognizing unit 156 of the robot 100 detects a user via the internal sensor 128, but the recognizing unit 212 of the server 200 may also detect the existence of a user via the external sensor 114. The external sensor 114 may also incorporate a smell sensor and a highly directional microphone. In particular, even when detection accuracy of the internal sensor 128 is insufficient with respect to sound and smell, detection accuracy can be increased by the internal sensor 128 being used in combination with the external sensor 114. Also, when capturing a user too, characteristics are more easily extracted by the same user being captured from a different angle by a camera incorporated in the external sensor 114, rather than using only the incorporated camera acting as the internal sensor 128.

In this embodiment, it has been described that the robot 100 captures various users, also acquires other data such as smell, speech, and body temperature when capturing, carries out an extraction of characteristics from these items of data, and identifies (clusters) a multiple of users by carrying out cluster analysis.

As a modified example, a user may set the physical characteristics and the behavioral characteristics of each user in the server 200 in advance. For example, as characteristics of Dad (01), information such as having a beard, getting up early, being 170 centimeters tall, and being a smoker may be provided as teacher data to the individual data storage unit 218 of the server 200. Based on these items of characteristic information, the server 200 may carry out user detection using an already known method, such as deep learning.

As easier user recognition means, the robot 100 may identify a user by regularly receiving user ID from a mobile device such as a smartphone possessed by the user. With regard to a pet too, easy identification can be carried out by attaching a radio frequency identifier (RFID) tag to a collar. According to this kind of control method, the processing burden of the robot 100 and the server 200 can be considerably reduced.

The robot 100 may identify the positional coordinates of the robot 100 by transmitting a search signal and receiving a response signal from each external sensor 114. Alternatively, the external sensor 114 may transmit a search signal with directivity, whereby the robot 100 may identify the distance and direction to the robot 100 from the external sensor 114.

A multiple of the robot 100 may exchange information with each other. When familiarity of a first robot 100 with respect to a user A is high, the first robot 100 may notify a second robot 100 of the familiarity (a favorable impression) with respect to the user A. Subsequently, the second robot 100 may initially set familiarity with respect to the user A to be high in advance, even when meeting for the first time.

According to this kind of control method, the user A, who is liked by the first robot 100, is liked by the second robot 100 even when meeting for the first time, because of which the user A can have a sense of being "a type liked by the robot 100".

When familiarity of the first robot 100 with respect to a user B is low too, the first robot 100 may notify the second robot 100 of the familiarity (a bad impression) with respect to the user B. Subsequently, the second robot 100 may set familiarity with respect to the user B to be low in advance, even when meeting for the first time.

According to this kind of control method, the user B, who is disliked by the first robot 100, is disliked by the second robot 100 even when meeting for the first time, because of which a user who bullies the robot 100 will be disliked by another robot 100 too. Consequently, control such that a reputation of a user spreads among the multiple of robots 100 can also be realized.

The recognizing unit 212 may carry out classification into a "liked type" and a "disliked type" based on familiarity. For example, it is assumed that familiarity of the robot 100 toward Dad (01) has decreased sharply. It is assumed that Dad (01) has characteristics of having a beard, having a loud voice, and smelling of cigarette smoke. In this case, when the robot 100 detects the smell of cigarette smoke from a user met for the first time, the robot 100 can express a prejudice against "smoking" by setting an initial value of familiarity with respect to the user to be lower than normal. In the same way, the robot 100 may also set an initial value of familiarity toward a person with a beard to be low. That is, an associative action selection is realized in that because the robot 100 dislikes Dad (01), the robot 100 also dislikes beards, which characterize Dad (01), and because the robot 100 dislikes beards, the robot 100 also dislikes another person who has a beard.

Conversely, a case in which familiarity with respect to Dad (01), who is a smoker, is extremely high will be considered. In this case, when the robot 100 detects the smell of cigarette smoke from a user met for the first time, the robot 100 may set the initial value of familiarity with respect to the user to be higher than normal. That is, an associative action selection is realized in that because the robot 100 likes Dad (01), the robot 100 also likes the smell of cigarette smoke, which characterizes Dad (01), and because the robot 100 likes the smell of cigarette smoke, the robot 100 likes smokers.

Furthermore, the robot 100 may remember the smell of a familiar user, and carry out an action seeking the smell. For example, when familiarity with respect to Dad (01) is high, an action map based on smell may be set so that the robot 100 feels attracted to a place that smells the same as Dad (01). The familiarity managing unit 220 may set not only familiarity of a user, but also familiarity of a smell category based on the familiarity of the user. For example, when the smell of a user 1 belongs to a smell category 1, the familiarity managing unit 220 may set familiarity equivalent to that of the user 1 for the smell category 1. Also, the server 200 may map the smell of each portion of a house using the external sensor 114 incorporating the smell sensor. Further, the action selection of the robot 100 may be influenced by setting an action map that adopts a point smelling the same as the smell category 1 as a pleasant point. For example, when the robot 100 has not met Dad (01), who has high familiarity, for some time, an action such that the robot 100 is attracted to a pleasant point smelling the same as Dad (01) is realized by giving weight to the smell action map.

In the same way, a point in a smell category the same as the smell of a user with low familiarity may be adopted as an unpleasant point. For example, behavior such that even after the hated small child (07) of the neighborhood has gone home, the robot 100 dislikes an unpleasant point smelling the same as the small child (07) may be executed.

The thresholds T1 to T3, which form references for action selection based on familiarity, may be fixed values, or may be variable values. For example, by the thresholds being randomly changed, a capricious behavior pattern of the robot 100 can be realized. When the robot 100 is bored, for example, when home alone and a period for which no user is detected is equal to or greater than a certain time, the thresholds T1 to T3 may be comprehensively reduced. In this case, an approaching action and an affectionate gesture are performed even with respect to a user whose familiarity is not so high, because of which "loneliness" of the robot 100 can be expressed by behavior. In the same way, the thresholds may be reduced when a room is dark or quiet, and the thresholds may be raised when satisfaction has increased owing to a large number of pleasant actions.

A user may freely set importance in the range of 0 to 1, or importance may be set automatically. A user with a high detection frequency, for example, a user for whom a number of detections in a predetermined period is equal to or greater than a predetermined number, is assumed to be highly likely to be a family member, and importance may be set at 1. In the same way, a user with a low detection frequency is assumed not to be a family member, and importance may be set at 0. Importance may be adjusted between 0 and 1 in accordance with detection frequency.

Also, a user recognized with high frequency in a predetermined time band in which the possibility that only family members exist is high, such as an early morning time band (for example, 6.00 a.m. to 8.00 a.m.) or an evening time band (for example, 8.00 p.m. to 10.00 p.m.), may be determined to be a family member. Further, the familiarity managing unit 220 may set importance to be high for a user detected with high frequency in this kind of time band. Importance may be determined by normalizing detection frequency between 0 and 1.

A user detected within a predetermined time from first turning on power to the robot 100 may be recognized as being a family member. The familiarity managing unit 220 may set 1 as the importance of a user detected within ten minutes from first turning on power to the robot 100. According to this kind of control method, the same kind of advantage as with a so-called imprinting can be realized.

Importance may be a fixed value or may be a variable value. Importance may be a long-term parameter that is unlikely to vary, and familiarity may be a short-term parameter that is liable to vary. Importance may decrease little by little when a user is not detected for a long period, and rise little by little when a user is detected frequently. Further, an overall familiarity may be defined by a combination of the two parameters, for example, by adding or multiplying. An algorithm such that familiarity is liable to rise and unlikely to decrease may be applied when importance is equal to or greater than a predetermined threshold, and an algorithm such that familiarity is liable to decrease and unlikely to rise may be applied when importance is less than the threshold.

According to this kind of control method, a bond between the robot 100 and a user is easy to maintain provided that the user is a family member, even when temporarily estranged, or when the robot 100 is subjected to a violent action. This is because importance is high, meaning that overall familiarity is unlikely to decrease. Even so, however, when there is long-term estrangement, not only familiarity but also importance decreases, overall familiarity decreases, and presently the bond also becomes weaker.

Meanwhile, the robot 100 takes time to become fond of a user who is not a family member. This is because importance is low, meaning that overall familiarity is unlikely to rise. Even so, however, familiarity and importance gradually rise when there is long-term involvement, overall familiarity increases, and presently a bond can be formed. When importance increases, familiarity is also liable to rise, because of which a state of "it didn't take to me at first, but we suddenly became friendly" can be realized.

When a user dies or disappears after an extremely strong bond is formed, and a state of absolute loyalty is entered, the robot 100 is also capable of performing compensatory behavioral expression wherein the robot 100 seeks characteristic information, for example, a smell, of the user, or seeks another user having physical characteristics in common with the user who is no longer present.

When a familiar family member appears for the first time in a long time, the robot 100 may express a "big welcome" by performing any affectionate gesture after an approaching action.

When non-detection of a user continues, familiarity decreases little by little. In this case, control may be such that familiarity decreases only a little in a first one week, but familiarity decreases sharply when one week is exceeded. According to this kind of control method, a "one week memory", which is a weakness of memory characteristic of a lower animal, can be expressed. A computer is characterized by being able to maintain a memory indefinitely. By expressing a lack of memory, a characteristic of an animal can be incorporated in the robot 100.

An initial value of familiarity may be caused to differ in accordance with importance.

An effect of the same pleasant action may be caused to differ in accordance with familiarity. For example, control may be such that familiarity rises further when the robot 100 is hugged by a user with high familiarity, but conversely, familiarity decreases when the robot 100 is hugged involuntarily by a user with low familiarity. Familiarity needs to be increased little by little by a user with low familiarity having him or herself clearly acknowledged, and gradually increasing familiarity while talking to and touching the body of the robot 100, before hugging the robot 100. According to this kind of control method, involvement similar to raising a wild animal can be realized.

In this embodiment, an affectionate gesture indicating goodwill to a person has been described, but a wary gesture may be defined as a gesture indicating wariness toward a person. As wary gestures, there are, for example, gestures of turning a back toward a user, or retreating. When meeting a user with low familiarity, the robot 100 may perform a wary gesture before performing a withdrawing action.

The eyes 110 of the robot 100 may be a display on which a pupil image is shown. The robot 100 may be provided with a "pupil control unit" that changes a position and size of the pupil image of the eyes 110.

Hereafter, the movement determining unit 138 and the action determining unit 140 are collectively called an "operation determining unit". When detecting a moving object such as a human or a pet, the robot 100 determines whether or not the moving object is a target of a shyness action. Familiarity with respect to the moving object being equal to or less than a predetermined threshold, a result of characteristic extraction being that the moving object cannot be classified into an existing cluster (the moving object cannot be identified as a human, or this is a first meeting), and the like, are conceivable as a reference for determining whether or not the moving object is a target of a shyness action. A designer of the robot 100 can set a determination reference arbitrarily.

It is sufficient that a shyness action is an action such as a movement (escape) in a direction away from a user that is a target of a shyness action (hereafter called an "avoided user"), thereby reducing the possibility of contact between the robot 100 and the avoided user. For example, the possibility of the robot 100 being contacted by an avoided user may be reduced by the robot 100 averting the pupil image from the avoided user, or in other words, by the robot 100 moving the line of sight from the avoided user. In the same way, closing the pupil image, averting the orientation of the neck or body from the avoided user, hiding behind something (to be described hereafter), bending the neck when being hugged by another user and pressing the head portion against the user's chest, and the like, are conceivable. When the robot 100 is being hugged, the robot 100 may perform a so-called glance, momentarily directing the line of sight toward the avoided user. Also, the robot 100 may threaten the avoided user by moving the arms 106 up and down in a flapping motion. The threatening need not actually produce an effect as a threat, rather it is sufficient to express by action an intention to threaten. In the case of a type of robot that speaks a human language, the robot may reduce an amount of speech when an avoided user is detected.

As heretofore described, the familiarity managing unit 220 updates familiarity with respect to a user with an interaction such as visual recognition of the user, physical contact, speaking, or the like, as a trigger. The recognizing unit 156 of the robot 100 may detect physical contact from a user using a touch sensor, a capacitance sensor for example, installed on a body surface of the robot 100.

The route compiling unit 222 of the server 200 generates an escape route in advance before an escape event occurs. The robot 100 moving along an escape route is also one kind of "shyness action". The movement starting position of an escape route is set as the current position of the robot 100, and the movement ending position (destination) is a position a predetermined distance or more away from the current point of the robot 100 or the current point of an avoided user, a point at which a user with familiarity of a predetermined threshold or greater exists, or a point at which a structure of a predetermined height or greater, such as a desk or a chair, exists. An escape event may be a moving object with familiarity of a predetermined threshold or less (an avoided user) being detected, or may be a predetermined number or more of moving objects being detected simultaneously within a predetermined period, for example, within one second. According to this kind of control method, the robot 100 can be caused to perform a shyness action when an unknown person or a disliked person appears, or when a large number of people appear simultaneously.

As heretofore described, the map managing unit 210 may manage both or one of a static map and a dynamic map. A "safe point" is registered on the static map. The "safe point" may be a point above which there is a blocking object, such as under a table, or a point within a predetermined distance from a wall. When detecting a place coinciding with the above definition during normal movement, the recognizing unit 156 of the robot 100 transmits a detection signal to the server 200. The map managing unit 210 of the server 200 registers the current position of the robot 100 at the time as a "safe point" on the static map. A "safe point" may also be set on the static map in advance by a user. When detecting a user (moving object) that is a target of a shyness action, the robot 100 refers to the dynamic map, and performs a shyness action of maintaining distance from the avoided user by setting a point at which a user with familiarity of a predetermined threshold or greater exists as a movement destination. Also, when detecting an avoided user, the robot 100 may refer to the static map, and move to any of one or more "safe points", for example, the nearest safe point.

A safety level may be set for a safe point. The robot 100 may select a safety point that is to be a movement destination based on both the safety level and the distance from the current point of the robot 100 to the safety point. A user may set the safety level on the static map, or the map managing unit 210 may calculate the safety level based on a predetermined evaluation function having various kinds of check items, such as the number and size of blocking objects and the distance from the blocking objects, as variables.

When a multiple of the robot 100 exist, one robot 100 may notify another robot 100 of "familiarity". For example, it is assumed that the first robot 100 has sufficient information about the user A, while the second robot 100 has no information about the user A, or has hardly any information. In this case, the first robot 100 notifies the second robot 100 of familiarity with respect to the user A. The second robot 100 adjusts the familiarity of the second robot 100 with respect to the user A based on the familiarity of the first robot 100 with respect to the user A. For example, when the familiarity of the first robot 100 with respect to the user A is "80" and the familiarity of the second robot 100 with respect to the user A is "50 (intermediate)", the second robot 100 may change the familiarity with respect to the user A to an average value of "65", or may change the familiarity to "80", the same as the first robot 100. According to this kind of control method, an aspect wherein the impression of the first robot 100 with respect to the user A spreads to the second robot 100, and a "preconception" of the second robot 100 toward the user A is formed, can be expressed.

The first robot 100 and the second robot 100 may exchange familiarity information. For example, when the familiarity of the first robot 100 with respect to the user A is "80" and the familiarity of the second robot 100 with respect to the user A is "−30", the first robot 100 may subtract a predetermined value, for example "10", thereby correcting the familiarity downward to "70", and the second robot 100 may add a predetermined value, for example "10", thereby correcting the familiarity with respect to the user A upward to "−20". According to this kind of control method, "impressions" with respect to the user A of a multiple of robots can be equalized, because of which an aspect such that a sentiment of the robot 100 is changed in accordance with an opinion of another robot 100 can be expressed. In addition to familiarity, various items of information, such as safe point information and user profile information, are conceivable as information that should be exchanged among a multiple of the robot 100.

The recognizing unit 212 may classify a user with familiarity higher than the threshold T3 as a "liked type", and a user with familiarity lower than a threshold T4 threshold T3) as a "disliked type". The familiarity managing unit 220 may extract characteristics of the liked type of user and the disliked type of user, and increase familiarity with respect to a third user who has characteristics that the liked type of user has, and the disliked type of user does not have. In the same way, the familiarity managing unit 220 may reduce familiarity with respect to a fourth user who has characteristics that the disliked type of user has, and the liked type of user does not have.

For example, when one or more of the liked type of user often wears red clothing, and the disliked type of user rarely wears red clothing, the familiarity managing unit 220 may increase familiarity with respect to another user when the user is wearing red clothing. According to this kind of control method, formation of a "preconception" toward a user met for the first time can be expressed based on characteristics of a liked type and a disliked type. A preconception is also effective in expressing "individuality" of the robot 100. User characteristics may be a habit such as scratching the head, biting the nails, or resting the chin on a hand, or a behavioral pattern such as a time of getting up (behavioral characteristics), may be physical characteristics such as eye size, skin color, smell, voice quality, or voice volume, or may be clothing worn.

The robot 100 or the server 200 may be provided with a life pattern accumulating unit that accumulates life patterns of a user. Alternatively, the communication unit 142 of the robot 100 may acquire life pattern information of each user as appropriate by accessing a life pattern accumulating unit formed as an external database. The life pattern accumulating unit registers a time of getting up, a time of leaving home to go to work or the like, a time of returning home, and a time of going to bed, as the life pattern information for each user. As there is normally variation in these times, an average value and a mode value thereof may be registered as representative values. Multiple kinds of life pattern data may be registered not only for each user, but also for each day of the week or season.

A life pattern may be set by a user. Alternatively, the robot 100 may detect a time of getting up and the like by observing the behavior of a user. For example, the robot 100 may identify the time at which a certain user A gets up by registering a time at which the user A comes out of a bedroom in the life pattern accumulating unit. The recognizing unit 156 of the robot 100 recognizes the user A getting up using the camera or the like, and the time at which the user A gets up is registered as a life pattern by the communication unit 142 recording the time of getting up in the data storing unit 148 or an external database.

The recognizing unit 156 may recognize a user B, who gets up earliest, as a "family member" at the beginning of a day. The recognizing unit 156 may also recognize a user who gets up within a predetermined time after the user B gets up as a family member. A user who gets up in a predetermined early morning time band, and a user who returns home in a predetermined evening time band, may be recognized as family members. The recognizing unit 156 may determine whether a user is a family member or a guest with a probability of getting up in the early morning time band being a predetermined probability or greater as a condition.

The recognizing unit 156 may recognize a user detected within a predetermined time from the robot 100 being introduced into the home and the power first being turned on as a family member, or a user may register him or herself as a family member in advance by carrying out a predetermined operation on the robot 100 in a state in which the user is captured by the camera of the robot 100. For example, when a user C is captured by the camera, or when the user C utters a predetermined keyword "I'm one of the family", the recognizing unit 156 may add the words "family member" to the user C (more specifically, to a profile of the user C). Furthermore, when the user C, who is a family member, introduces a user D with the words "he's one of the family", the recognizing unit 156 may recognize the user D as a family member. In this way, when a first user acknowledged as a family member informs the robot 100 that a second user is also a family member, in a state in which the first user and the second user are being captured, the recognizing unit 156 may recognize the second user as a family member.

A shyness action may be an action of avoiding contact with an avoided user. The avoiding action may involve retreating behind a "blocking object" such as a thing or a person. For example, when an avoided user D and a user E with high familiarity exist, the movement determining unit 138 (or the route compiling unit 222) may determine the direction of movement of the robot 100 so that the user E is positioned between the point at which the robot 100 exists and the point at which the user D exists, or in other words, to a position in which the robot 100 is hidden from the user D by the user E.

A blocking object may be an object of a predetermined height or greater, such as a desk, a wall, or a chair, or may be a user with familiarity of a predetermined threshold or greater, a user acknowledged as a family member, or another user E whose familiarity is at least higher than that of the heretofore described user D. When there are two avoided users, the operation determining unit may give priority to avoiding the avoided user with the lower familiarity.

The robot 100, not needing to actually hide from the user D, may perform an avoiding action seen to be an "intention to hide". For example, even when the robot 100 hides behind a chair, the user D may be able to visually recognize that the robot 100 is behind the chair. The robot 100 may move away from the user D until the user D is no longer captured by the mounted camera. The robot 100 may move so that the user D is in a blind spot of the mounted camera. The user D not being captured by the camera of the robot 100 does not necessarily mean that the robot 100 is not visible to the user D. In this case, animal-like behavior of "sticking its head in the ground with its bottom in the air" can be expressed.

When a moving object that is a target of a shyness action is detected during a first operation, the operation determining unit may cancel the first operation. After cancelling the first operation, the operation determining unit may instruct the drive mechanism 120 to perform a shyness action. For example, when detecting someone's return home via an intercom or the like, the robot 100 moves to the hall to greet the person. However, when the person returning home is an avoided user, the robot 100 may abort the greeting, and move to a living room or the like (an avoiding action). Various behavior patterns, such as playing by going around and around in the same place, moving toward a cool place, and dancing, are envisaged as a first action.

The server 200 or the robot 100 may have an emotion managing unit. The emotion managing unit manages various emotion parameters indicating emotions (loneliness, curiosity, a desire for approval, and the like) of the robot 100. These emotion parameters constantly fluctuate. The importance of the multiple of action maps changes in accordance with the emotion parameters, a movement target point of the robot 100 changes in accordance with the action maps, and the emotion parameters change in accordance with movement of the robot 100 and the passing of time.

For example, when the emotion parameter indicating loneliness is high, the emotion managing unit sets the weighting coefficient of the action map that evaluates places in which the robot 100 feels at ease to be high. When the robot 100 reaches a point on the action map at which loneliness can be eliminated, the emotion managing unit reduces the emotion parameter indicating loneliness. Also, each kind of emotion parameter also changes in accordance with a response action to be described hereafter. For example, the emotion parameter indicating loneliness decreases when the robot 100 is "hugged" by an owner, and the emotion parameter indicating loneliness increases little by little when the robot 100 does not visually recognize an owner for a long time.

What is claimed is:

1. An autonomously acting robot, comprising:
    a processor configured to execute instructions for:
        receiving information related to a safe point, wherein the safe point is a predetermined location;
        receiving a signal indicating detection of a first moving object, wherein the safe point is independent of the first moving object;
        updating familiarity associated with the first moving object in response to receiving the signal indicating detection of the first moving object; and
        determining a movement destination, wherein the movement destination is determined to be the safe point in response to the updated familiarity of the first moving object being lower than a first threshold value; and
    a drive mechanism connected to the processor, wherein the drive mechanism is configured to execute movement toward the movement destination.

2. The autonomously acting robot according to claim 1, wherein the processor is configured to execute the instructions for:
    receiving a signal indicating detection of a second moving object different from the first moving object; and
    determining the movement destination to be the second moving object in response to a familiarity associated with the second moving object being equal to or higher than the first threshold value.

3. The autonomously acting robot according to claim 2, wherein the processor is configured to execute the instructions for determining the movement destination to be a destination where the second moving object is positioned between the robot and the first moving object on a straight line connecting the first moving object and the robot.

4. The autonomously acting robot according to claim 2, wherein the processor is configured to execute the instructions for selecting an affectionate gesture defined as a gesture indicating goodwill toward the second moving object in response to the familiarity associated with the second movement object being equal to or higher than a second threshold value, and the second threshold value is higher than the first threshold value.

5. The autonomously acting robot according to claim 1, wherein the processor is configured to execute the instructions for changing the familiarity associated with the first moving object in accordance with a frequency with which the first moving object is detected.

6. The autonomously acting robot according to claim 1, wherein the processor is configured to execute the instructions for changing the familiarity associated with the first moving object in response to detection of physical contact with the first moving object.

7. The autonomously acting robot according to claim 6, wherein the processor is configured to execute the instructions for changing the familiarity associated with the first moving object in response to a detection that the first moving object lifts the robot.

8. The autonomously acting robot according to claim 1, wherein the processor is configured to execute the instructions for:
    receiving a signal indicating detection of a second moving object different from the first moving object; and
    determining the movement destination to be the second moving object in response to a familiarity associated with the second moving object being higher than the familiarity associated with the first moving object.

9. The autonomously acting robot according to claim 1, further comprising an olfactory sensor configured to detect a smell and classifies the detected smell, wherein
    the processor is configured to execute the instructions for:
        relating a category of the detected smell of a detected moving object with a familiarity associated with the detected moving object, and
        determining the movement destination to be a pleasant point in response to a detected smell at the pleasant point belonging to a same smell category as a smell category correlated to the detected moving object and the familiarity associated with the detected moving object being equal or higher than a second threshold value.

10. The autonomously acting robot according to claim 1, wherein the processor is configured to execute the instructions for:
    receiving information related to a general group of moving objects,
    updating familiarity of moving objects associated with the general group of moving objects using a first algorithm,
    receiving information related to a special group of moving objects, and
    updating familiarity of moving objects associated with the special group of moving objects using a second algorithm different from the first algorithm.

11. The autonomously acting robot according to claim 1, wherein the processor is configured to execute the instructions for determining the movement destination in accordance with a predetermined escape route in response to the familiarity associated with the first moving object being less than a second threshold value less than the first threshold value.

12. The autonomously acting robot according to claim 1, wherein the processor is configured to execute the instructions for:
   receiving information related to a plurality of safe points, and
   selecting the safe point from the plurality of safe points based on the selected safe point being at least a predetermined distance away from the first moving object.

13. The autonomously acting robot according to claim 1, wherein the processor is configured to execute the instructions for:
   setting at least one safe point, wherein each safe point of the at least one safe point is based on a location adjacent to an object having a height greater than a predetermined height, and
   selecting the safe point from the at least one safe point.

14. The autonomously acting robot according to claim 1, wherein the processor is configured to execute the instructions for:
   setting at least one safe point, wherein each safe point of the at least one safe point is based on a location under a blocking object, and
   selecting the safe point from the at least one safe point.

15. An autonomously acting robot, comprising:
   a processor configured to execute instructions for:
      initiating a first operation in response to a first signal, wherein the first operation is associated with a first familiarity level;
      receiving a second signal indicating detection of a moving object;
      determining whether the moving object is a target of a shyness action based on a second familiarity level associated with the moving object and a predetermined determination reference, wherein the second familiarity level is less than the first familiarity level;
      selecting a shyness action in response to a determination that the moving object is a target of a shyness action;
      interrupting the first operation, different from the selected shyness action, in response to the determination that the moving object is a target of a shyness action; and
   a drive mechanism connected to the processor, wherein the drive mechanism is configured to execute the first operation, interrupt the first operation, and execute the selected shyness action.

16. The autonomously acting robot according to claim 15, wherein the processor is configured to execute the instructions for:
   updating a familiarity associated with the moving object based on a detected interaction with the moving object, and
   determining that the moving object is a target for a shyness action in response to the updated familiarity being less than a predetermined threshold.

17. The autonomously acting robot according to claim 15, wherein the processor is configured to execute the instructions for selecting the shyness action to be avoiding the moving object.

18. The autonomously acting robot according to claim 17, wherein the processor is configured to execute the instructions for selecting the shyness action to be setting an avoiding direction such that the moving object enters a blind spot of the robot.

19. The autonomously acting robot according to claim 15, further comprising a display for displaying a pupil image of the robot,
   wherein the processor is configured to execute the instructions for controlling the display to change the pupil image in response to the determination that the moving object is a target of a shyness action.

20. An autonomously acting robot, comprising:
   a processor configured to execute instructions for:
      receiving a signal indicating detection of a moving object;
      initiating a first operation in response to the received signal;
      determining whether the moving object is a target of a shyness action based on a predetermined criteria;
      selecting a shyness action in response to a determination that the moving object is a target of a shyness action;
      interrupting the first operation, different from the selected shyness action, in response to the determination that the moving object is a target of a shyness action; and
   a drive mechanism connected to the processor, wherein the drive mechanism is configured to execute the first operation, interrupt the first operation, and execute the selected shyness action based on instructions from the processor.

* * * * *